United States Patent
Inui

(10) Patent No.: US 8,539,227 B2
(45) Date of Patent: Sep. 17, 2013

(54) DIGITAL BROADCASTING RECEIVING APPARATUS AND SCRAMBLE CHANNEL DECIDING METHOD CAPABLE OF SHORTENING TIME REQUIRED FOR SCRAMBLE DECISION

(75) Inventor: Yasuhiro Inui, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1098 days.

(21) Appl. No.: 12/350,048

(22) Filed: Jan. 7, 2009

(65) Prior Publication Data

US 2009/0193488 A1 Jul. 30, 2009

(30) Foreign Application Priority Data

Jan. 28, 2008 (JP) ................................ 2008-016461

(51) Int. Cl.
*H04L 29/06* (2006.01)

(52) U.S. Cl.
USPC ........................... 713/160; 713/189; 725/151

(58) Field of Classification Search
USPC .................................................. 713/160.189
See application file for complete search history.

(56) References Cited

U.S. PATENT DOCUMENTS

| | | | | |
|---|---|---|---|---|
| 6,295,604 | B1 * | 9/2001 | Callum ........................... | 713/160 |
| 7,730,515 | B1 * | 6/2010 | MacCormack et al. ...... | 725/139 |
| 2003/0046686 | A1 * | 3/2003 | Candelore et al. ............... | 725/31 |
| 2003/0115594 | A1 * | 6/2003 | Koo et al. ......................... | 725/31 |
| 2004/0004977 | A1 * | 1/2004 | Robbins et al. ................ | 370/535 |
| 2004/0181800 | A1 * | 9/2004 | Rakib et al. ....................... | 725/25 |
| 2005/0160453 | A1 * | 7/2005 | Kim ................................. | 725/39 |
| 2006/0107285 | A1 * | 5/2006 | Medvinsky ....................... | 725/25 |
| 2007/0245395 | A1 * | 10/2007 | Masuda .......................... | 725/131 |

FOREIGN PATENT DOCUMENTS

| | | |
|---|---|---|
| JP | 9-130764 | 5/1997 |
| JP | 2001-333339 | 11/2001 |
| JP | 2001-346109 | 12/2001 |
| JP | 2002-271322 | 9/2002 |
| JP | 2002-374472 | 12/2002 |
| JP | 2007-181005 | 7/2007 |
| JP | 2008-5414 | 1/2008 |

OTHER PUBLICATIONS

Japanese Notice of Ground of Rejection for Patent application No. 016461/2008, Mailed Oct. 27, 2009, and English translation thereof, 8 pages.
Patent Abstracts of Japan for patent application with Publication No. 2007-181005, Publication Date: Jul. 12, 2007, 1 page.
Patent Abstracts of Japan for application with Publication No. 2008-005414, Publication Date: Jan. 10, 2008, 1 page.
Patent Abstracts of Japan for Japanese Publication No. 2002-374472, Publication date Dec. 26, 2002 (1 page).
Patent Abstracts of Japan for Japanese Publication No. 09-130764, Publication date May 16, 1997 (1 page).
Patent Abstracts of Japan for Japanese Publication No. 2001-346109, Publication date Dec. 14, 2001 (1 page).
Patent Abstracts of Japan for Japanese Publication No. 2001-333339, Publication date Nov. 30, 2001 (1 page).
Patent Abstracts of Japan for Japanese Publication No. 2002-271322, Publication date Sep. 20, 2002 (1 page).

* cited by examiner

*Primary Examiner* — Pankaj Kumar
*Assistant Examiner* — Timothy Newlin
(74) *Attorney, Agent, or Firm* — Osha Liang LLP

(57) ABSTRACT

In a digital broadcast receiving apparatus, a receiver receives video packets or audio packets configuring a program of digital broadcast. A selector selects a part of the video packets or the audio packets of each channel received by the receiver. A determination unit determines whether or not decoding of the part of the packets selected by the selector has been completed normally. A decision unit decides requirement for descramble processing of each channel based on the determination result of the determination unit.

20 Claims, 6 Drawing Sheets

| PHYSICAL CH | SUB CH | SCRAMBLE INFORMATION | | SCRAMBLE DECISION RESULT |
|---|---|---|---|---|
| | | transport | PES | |
| ⋮ | ⋮ | ⋮ | ⋮ | ⋮ |
| 21 | 3 | – | – | – |
| | 2 | Y | – | – |
| | 1 | Y | Y | – |
| 16 | 4 | – | – | – |
| | 3 | – | – | – |
| | 2 | Y | Y | – |
| | 1 | – | Y | – |
| 10 | 2 | – | – | Y |
| | 1 | – | – | – |
| ⋮ | ⋮ | ⋮ | ⋮ | ⋮ |

FIG.2

| PHYSICAL CH | SUB CH | SCRAMBLE INFORMATION | | SCRAMBLE DECISION RESULT |
|---|---|---|---|---|
| | | transport | PES | |
| ⋮ | ⋮ | ⋮ | ⋮ | ⋮ |
| 21 | 3 | – | – | – |
| | 2 | Y | – | – |
| | 1 | Y | Y | – |
| 16 | 4 | – | – | – |
| | 3 | – | – | – |
| | 2 | Y | Y | – |
| | 1 | – | Y | – |
| 10 | 2 | – | – | Y |
| | 1 | – | – | – |
| ⋮ | ⋮ | ⋮ | ⋮ | ⋮ |

DIGITAL BROADCASTING RECEIVING APPARATUS AND SCRAMBLE CHANNEL DECIDING METHOD CAPABLE OF SHORTENING TIME REQUIRED FOR SCRAMBLE DECISION

BACKGROUND OF THE INVENTION

1. Field of the Invention

The present invention relates to a digital broadcasting receiving apparatus and a scramble channel deciding method, and particularly to a digital broadcasting receiving apparatus, and a scramble channel deciding method capable of shortening time required for scramble decision for each channel in a case where a channel map is created in the digital broadcast receiving apparatus.

2. Description of the Background Art

In recent years, standardization and practical applications of digital broadcast have been advanced even in the field of television broadcast, and various techniques for transmission and reception of program data have been disclosed.

For example, Document 1 (Japanese Patent Laying-Open No. 2002-374472) discloses a technique in which in a digital broadcast receiving apparatus, in order to prevent PCR (Program Clock Reference) information of TS (transport stream) packets from becoming improper due to delay time occurring when a transport stream of a plurality of received programs is outputted externally, a PCR corrector corrects PCR data (Program Clock Reference value) with a value of STC (System Time Clock) counting means when the TS packets are externally outputted if the delay time occurs during the external output of the TS packets including PCR.

Moreover, Document 2 (Japanese Patent Laying-Open No. 09-130764) discloses a technique in which in order to shorten time required for changing a program number involving switchover of a physical channel, on the transmission side, a portion of a program number is set as a number of the physical channel, and a relation between the program number and a PID (packet identification) pointing to a PMT (Program Map Table) is fixed, while on the receiving side, a program association table is stored in advance. In such a technique, on the receiving side, the number of the physical channel is identified from the set program number when the program number is changed, and whether or not the number of the identified physical channel is the same as a number of a physical channel being received is decided. If the number is not the same, the channel is changed to the identified physical channel, and concurrently, in the PAT (Program Association Table) stored in the receiving apparatus, an elementary PID and a PCR_PID corresponding to the program number are extracted from a PMT having a PMT_PID (PID pointing to a PMT) corresponding to the program number, and a packet having the extracted elementary PID and PCR_PID is taken out from a transport stream to perform the program switchover.

Moreover, Document 3 (Japanese Patent Laying-Open No. 2001-346109) discloses a technique in which in a digital broadcast receiver, a PID of video data or audio data is predicted based on the channel number subjected to channel selecting instruction to achieve high-speed channel selection processing.

Furthermore, Document 4 (Japanese Patent Laying-Open No. 2001-333339) discloses a technique in which in a digital broadcast receiver, change in contents of an information table (PMT) is checked by checking a value of a CRC (Cyclic Redundancy Check), each PID of video, audio and PCR, and the like on a second-to-second base, and if there is any change, it is determined that the switchover of a program has been detected to set a program parameter described in the information table as a signal extracting parameter and to execute the channel change with the signal extracting parameter validated.

For the digital broadcast, a communication system by a conditional access system with payment of charge and the like as conditions is also realized. In such a communication system, whether or not descramble processing is required for each channel is decided.

At the time of the above-described requirement decision, in a system employing, for example, an MPEG-TS (Moving Picture Experts Group Transport Stream), in principle, the requirement decision has been performed based on a value of data in a bit field of "transport scrambling control" of a header of each TS packet, or in a bit field of "PES scrambling control" of a PES (Packetized Elementary Stream) packet. Based on the decision result, scramble information for each channel is stored on the receiving apparatus side as a table of a channel map, as shown in FIG. 6, for example.

In the table shown in FIG. 6, a plurality of sub-channels (sub Ch) (in some cases, one sub-channel) are defined in each physical channel (physical Ch). In each of the sub-channels, the scramble information (requirement for descramble processing) based on a TS packet is indicated in a field of "transport" and the scramble information based on a PES packet is indicated in a field of "PES". In FIG. 6, if the descramble processing is required, or if the decision is disabled, "Y" is indicated, and if the descramble processing is not required, "-" is indicated. In FIG. 6, hatching is applied to the field corresponding to the sub Ch requiring the descramble processing. In the digital broadcast receiving apparatus, when an operation for switching outputted channels sequentially is performed, the channels requiring the descramble processing are skipped to switch the channel, as shown by arrow in FIG. 6.

Moreover, for the above-described communication system by the conditional access system, various techniques have been disclosed. For example, Document 5 (Japanese Patent Laying-Open No. 2002-271322) discloses a technique in which with each channel of digital broadcast, on the transmission side, PID information specific to a system indicating a PID as a scramble object is stored in advance, and is compared with PID information of each data packet to execute the scramble processing for the data packet, and on the receiving side, PID information specific to the system indicating a PID as a descramble object is stored in advance, and is compared with a PID of each received data packet to thereby select a packet as the object of the descramble processing.

In actual broadcast, the above-described bit field may not be provided in each received or transmitted packet. In this case, the decision of the requirement for the descramble processing based on the value of the specific bit field in the TS packet or the PES packet as described with reference to FIG. 6 is disabled.

In the above-described case, in creating a channel map, for example, for each sub Ch of each physical channel shown in FIG. 7, PIDs of video data (Video_PID) and/or PIDs of audio data (Audio_PID) configuring the sub Ch of interest are acquired based on a PMT 901 of the sub Ch of interest, as shown in a field 902 in FIG. 7. Based on the acquired PIDs, all packets of the video data and the audio data configuring the sub Ch of interest are acquired, and for each of the packets, whether or not it can be decoded properly by a decoder is decided, so that whether or not the sub Ch requires the descramble processing is decided based on the above-described decision result.

However, in this case, since whether or not the decoding is enabled is decided for each of the packets of the object channel, there has been a problem that the creation of the channel map takes long time, so that the operability at the time of channel selection in the receiving apparatus is deteriorated.

In the technique disclosed in Document 5, since the PIDs of the packets as the scramble/descramble objects need to be stored in advance in the transmitting apparatus and the receiving apparatus, there has been a problem that the configuration of the broadcast system is complex.

SUMMARY OF THE INVENTION

The present invention has been devised in light of the above-described situation, and an object thereof is to provide a digital broadcast receiving apparatus and a scramble channel deciding method capable of shortening time required for the creation of a channel map without requiring a complex structure of a broadcast system.

A digital broadcast receiving apparatus of the present invention includes a receiver that receives video packets or audio packets configuring a program of digital broadcast, a selector that selects a part of the video packets or the audio packets of each channel received by the receiver, a determination unit that determines whether or not decoding of the packets selected by the selector has been completed normally, and a decision unit that decides requirement for descramble processing of each channel based on a determination result of the determination unit.

A scramble channel deciding method of the present invention is a scramble channel deciding method in a digital broadcast receiving apparatus that receives video packets or audio packets configuring a program of digital broadcast. The method includes the steps of: selecting the part of the video packets or the audio packets of each channel received, determining whether or not decoding of the part of the selected packets has been completed normally, and deciding requirement for descramble processing of each channel, based on the determination result.

According to the present invention, in the digital broadcast receiving apparatus, the decision of the requirement for the descramble processing of each channel is performed based on the determination result of whether or not the decoding of the part of the packets selected from the video packets (or the audio packets) of each channel received by the digital broadcast receiving apparatus has been completed normally.

This can shorten the time required for the creation of the channel map without requiring a complex structure of a broadcast system even when the decision of the requirement for the descramble processing is performed based on the result of the decoding of the received packets.

In the present invention, the digital broadcast receiving apparatus may be configured as follows. The digital broadcast receiving apparatus may include a receiver that receives video packets or audio packets configuring a program of digital broadcast, a selector that selects a part of the video packets of each channel received by the receiver, a determination unit that determines whether or not decoding of the part of the video packets selected by the selector has been completed normally, and a decision unit that decides requirement for descramble processing of each channel based on the determination result of the determination unit, wherein the decision unit may decide the requirement for the descramble processing of each channel based on a value of a specific bit field of each of the video packets or the audio packets of each channel received by the receiver, and with a channel for which the requirement for descramble processing based on the value of the specific bit field could not be decided, the requirement for the descramble processing may be decided based on the determination result of the determination unit, the receiver may receive a PCR packet configuring a predetermined channel, and configuration information including first information for identifying the PCR packet and second information that is information for identifying a video packet or an audio packet configuring the predetermined channel, the first information may be an ID of the PCR packet, and the selector may select a video packet having the same second information as the first information by referring to the configuration information.

In this case, the requirement for the descramble processing of each channel is first decided based on the value of the specific bit field of each of the video packets or the audio packets of each channel, and with the channel for which the requirement for descramble processing could not be decided by the above-described processing, the decision of the requirement for the descramble processing based on the above-described decoding result of the packets is performed. Thereby, the decision of the requirement for the descramble processing of each channel can be realized by the processing performed in a shorter time than that required for the decision based on the result of the decoding of the packets, as much as possible, so that the channel map can be created in a shorter time.

Moreover, in this case, in each channel the video packet or the audio packet identified by the same information as the information for identifying the clock reference packet is utilized for the decision of the requirement for the descramble processing. This allows the video packet or the audio packet having higher importance in each channel to be used for the requirement for descramble processing.

In this case, even when both the video packet and the audio packet are included in each channel, the video packet is selected as the packet used for the decision of the requirement for the descramble processing. Probability that the video packet is included as the packet configuring the program of digital broadcast is higher than that of the audio packet. Thus, according to the present invention, in the digital broadcast receiving apparatus, the selection of the packet utilized for the requirement decision of the descramble processing can be performed in a shorter time. Moreover, since the packet of the type having high probability of reception is selected as the packet used for the decision of the requirement for the descramble processing, the decision of the requirement for the descramble processing can be surely performed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram schematically showing contents of a channel map stored in a memory in FIG. 1.

DESCRIPTION OF THE PREFERRED EMBODIMENTS

Figure 1:
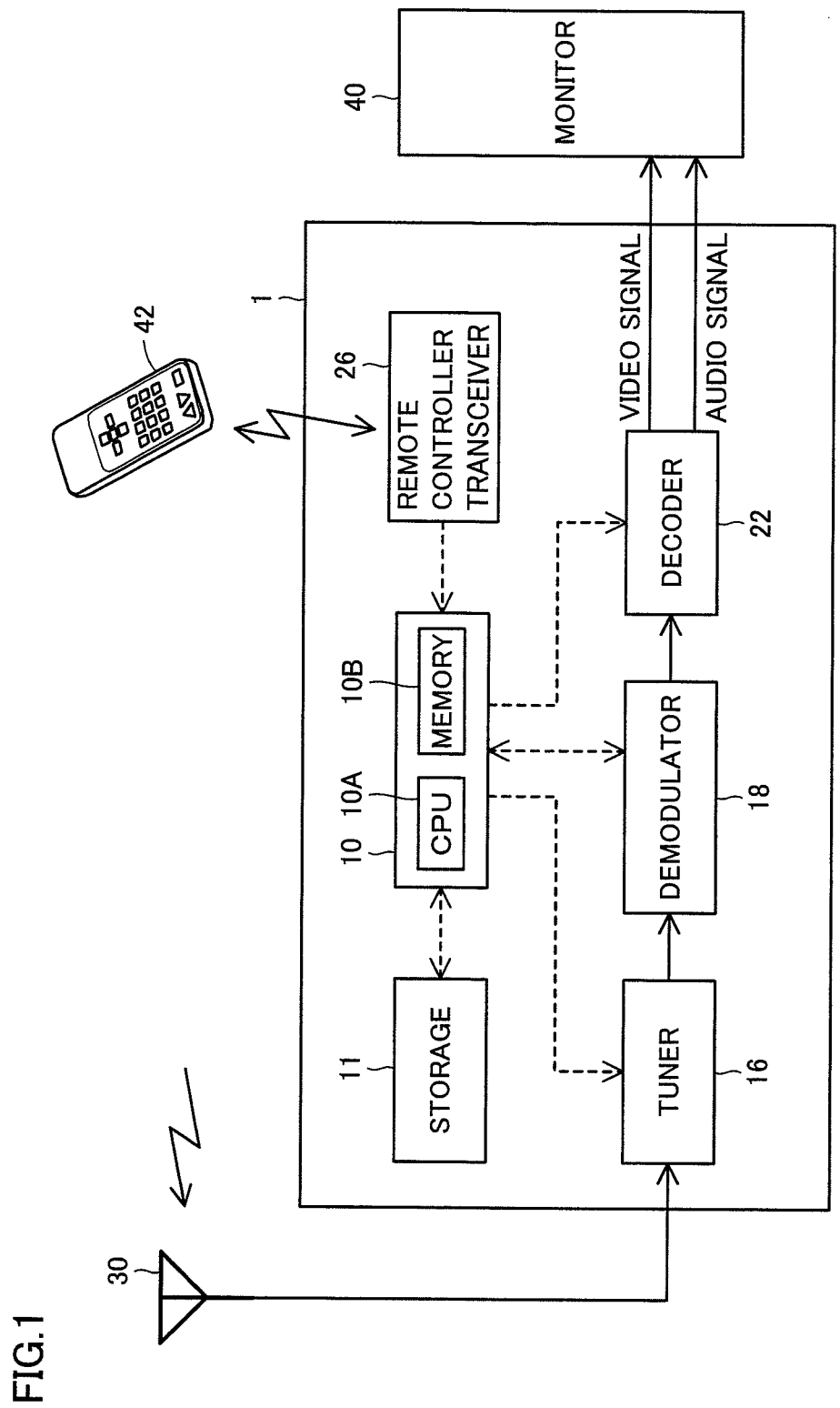
FIG. 1 is a diagram schematically showing a configuration of a broadcast receiving apparatus, which is one embodiment of a digital broadcast receiving apparatus of the present invention.

Hereinafter, referring to the drawings, a broadcast receiving apparatus as one embodiment of a digital broadcast receiving apparatus of the present invention is described. In the description below, the same reference numerals are given to the same components. This applied to names and functions thereof. Accordingly, detailed descriptions thereof are not repeated.

Referring to FIG. 1, a broadcast receiving apparatus 1 as one embodiment of the present invention receives a broadcast signal from an antenna 30, and receives a command signal from a remote controller 42, and outputs a video signal and an audio signal to a monitor 40. Monitor 40 may be configured integrally with broadcast receiving apparatus 1, or may be separated from broadcast receiving apparatus 1.

Antenna 30 receives the broadcast signal transmitted through electric waves from a broadcast station to supply broadcast receiving apparatus 1 with the broadcast signal.

Remote controller 42 receives an operation from a user, and transmits an operation signal in accordance with the operation by the user to broadcast receiving apparatus 1 through infrared rays. The operation signal outputted from remote controller 42 is not limited to that through infrared rays, but may be transmitted wirelessly. In place of remote controller 42 and a remote controller transceiver 26, or in conjunction with remote controller 42 and remote controller transceiver 26, a body of broadcast receiving apparatus 1 may be provided with an operation receiver that receives the operation from the user and outputs the operation signal to a controller 10.

Broadcast receiving apparatus 1 includes controller 10, a storage 11, a tuner 16, a demodulator 18, a decoder 22 and remote controller transceiver 26.

Controller 10 includes a CPU 10A that executes a program, and a memory 10B that stores the program to be executed, data during the program execution, and data resulting from the program execution.

Storage 11 stores various types of information such as a file generated by recording broadcast in broadcast recording apparatus 1 and the like.

The program that controller 10 executes may be stored in a storage device fixed to the body of broadcast receiving apparatus 1, such as memory 10B and storage 11, or may be recorded on a recording medium detachable from the body of broadcast receiving apparatus 1. Moreover, the above-described program may be installed in memory 10B or storage 11 through a network. In controller 10, functions as shown in the present embodiment may be realized by executing the program recorded on a recording device of an apparatus different from broadcast receiving apparatus 1, such as an apparatus connected through a network.

Tuner 16 extracts a broadcast signal corresponding to a channel selected in accordance with a command from controller 10 from received broadcast signals. Tuner 16 outputs the extracted broadcast signal to demodulator 18.

Demodulator 18, upon receiving the broadcast signal from tuner 16, demodulates the broadcast signal to an MPEG-2TS (Moving Picture Experts Group phase 2 Transport Stream) signal obtained by digitally encoding video and audio data, and outputs the MPEG-2TS signal to decoder 22.

Here, the digital-television broadcast signal is encoded with Reed-Solomon coding and convolution coding to be transmitted. Demodulator 18 can, therefore, perform error correction in the above-described decoding processing. In this processing step of the error correction, demodulator 18 performs the operation of a received-data error rate of the received broadcast signal to output the received-data error rate to controller 10.

The digital-television broadcast includes a Japanese ISDB-T (Integrated Services Digital Broadcasting for Terrestrial) system, a US ATSC (Advanced Television Systems Committee) system, and Euro DVB-T (Digital Video Broadcasting for Terrestrial). Broadcast receiving apparatus 1 can support any of the above-described systems.

Decoder 22 decodes the MPEG-2TS signal received from demodulator 18 to a video signal and an audio signal. Decoder 22 outputs the decoded video signal and audio signal to monitor 40.

Remote controller transceiver 26 receives the operation signal from remote controller 42, and outputs the received operation signal to controller 10. Moreover, remote controller transceiver 26 transmits predetermined information received from controller 10 to remote controller 42.

Controller 10 controls tuner 16, demodulator 18, and decoder 22 in accordance with the operation signal received from remote controller transceiver 26.

Monitor 40 converts the video signal and the audio signal from decoder 22 to video and audio, respectively, and outputs the converted video and audio so that the user can view and listen to them.

FIG. 2 schematically shows one example of a channel map created in broadcast receiving apparatus 1. CPU 10A creates such a channel map and stores the same in memory 10B, for example.

Figures 6, 7:
FIG. 6 is a diagram schematically showing contents of a channel map handled in a conventional broadcast receiving apparatus.
FIG. 7 is a diagram for describing contents of scramble decision in the conventional broadcast receiving apparatus.

The channel map shown in FIG. 2 further includes a field of "scramble decision result" for each sub Ch, as compared with the channel map shown in FIG. 7. In FIG. 2, a field of transport indicates a decision result of the requirement for the descramble processing (scramble information) based on a value of a specific bit field in a TS packet of each sub Ch. A field of PES indicates scramble information based on a value of a specific bit field in a PES packet of each sub Ch.

In the channel map shown in FIG. 2, the field of the scramble decision result is a field indicating a result from deciding the requirement for the descramble processing based on another information when the decision of the requirement for the descramble processing by the value of the specific bit field in the TS packet or the PES packet is disabled.

In the present specification, in the following description, for each sub Ch, a case where the descramble processing is required is referred to as "having scramble", and a case where the descramble processing is not required is referred to as "having no scramble". In FIG. 2, in a field corresponding to a channel having scramble, a "Y" mark is indicated, and hatching is applied.

Figure 3:
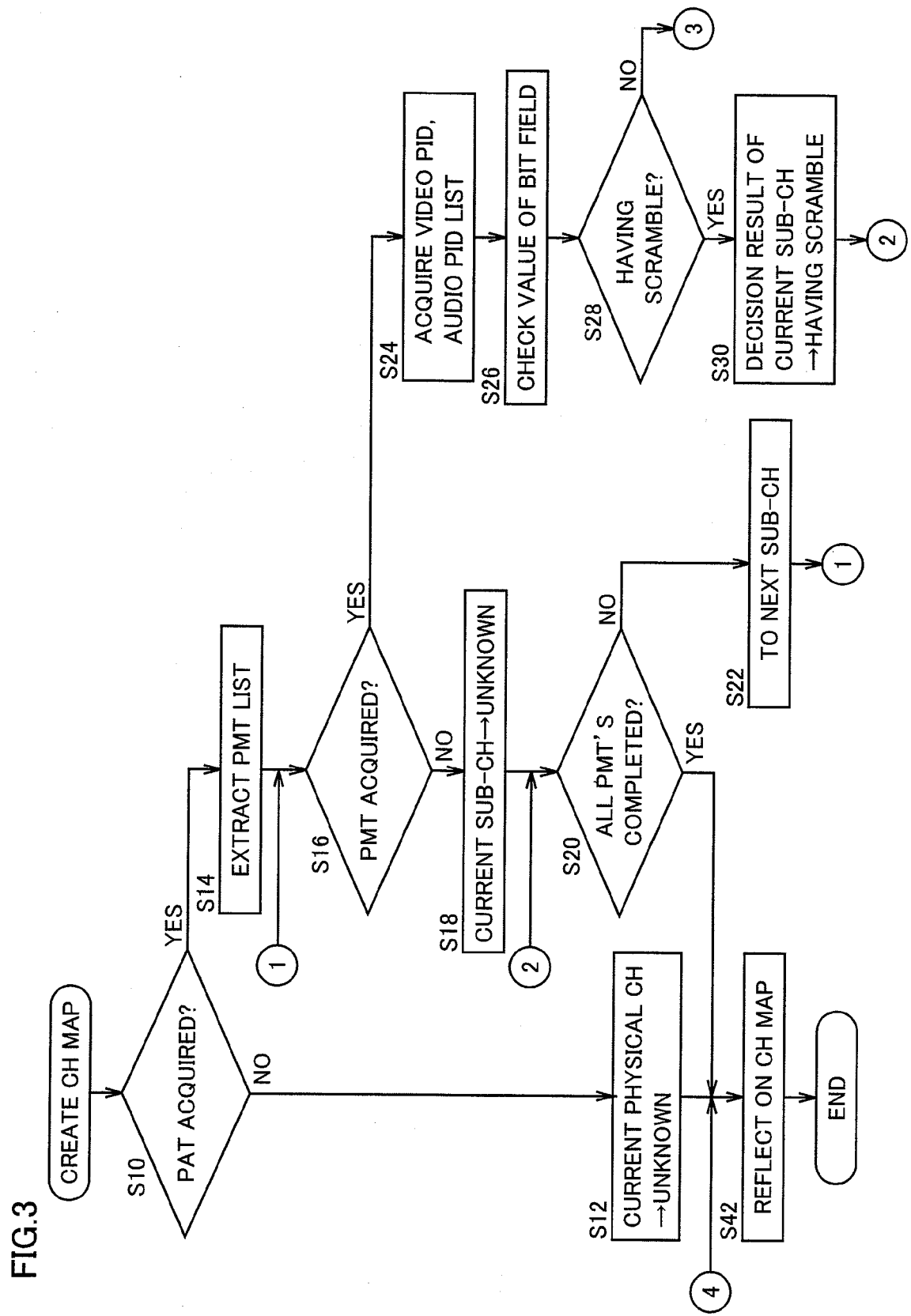
FIG. 3 is a flowchart of channel map creating processing that a CPU (Central Processing Unit) in FIG. 1 executes.
Figure 4:
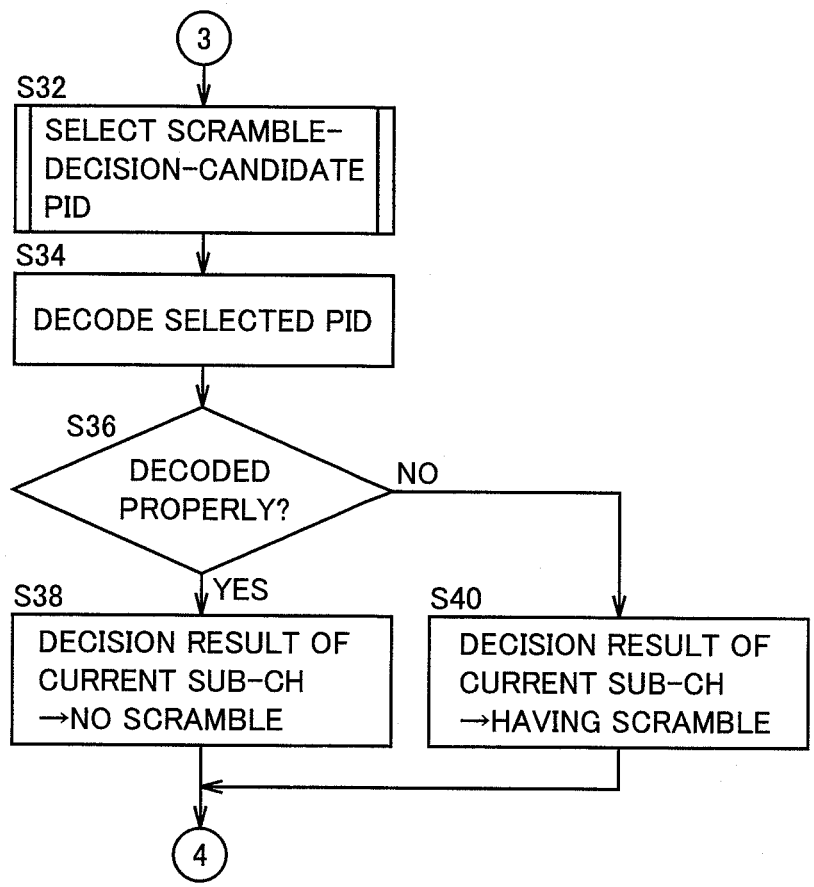
FIG. 4 is a flowchart of the channel map creating processing that the CPU in FIG. 1 executes.

Next, referring to FIGS. 3 and 4, which are flowcharts of processing, a description of the processing for creating the channel map (channel map creating processing) that CPU 10A executes in broadcast receiving apparatus 1 is given.

First, referring to FIG. 3, upon controlling tuner 16 so as to extract a broadcast signal of a certain physical channel, CPU 10A determines whether or not it has received (acquired) a PAT of the physical channel of interest in step S10, and if it determines that the PAT have been acquired, advances the processing to step S14. On the other hand, if it could not acquire the PAT (even though a predetermine time-out period has passed), CPU 10A advances the processing to step S12.

In step S12, CPU 10A determines the scramble information and the scramble decision results to be unknown with respect to all sub-channels of the physical channel the broadcast signal of which CPU 10A currently causes tuner 16 to receive, and advances the processing to step S42.

On the other hand, in step S14, CPU 10A performs processing of extracting a PMT of each of the sub-channels by decoding the PAT determined to have been acquired in step 10, and advances the processing to step S16.

In step S16, CPU 10A determines whether or not the PMT could be extracted with respect to the sub-channel as a current processing object by the extraction processing in step S14, where one sub-channel among the sub-channels configuring the current physical channel is set as the processing object. If CPU 10A determines that the PMT could be extracted, it advances the processing to step S24, and if it determines that the PMT could not be extracted, it advances the processing to step S18.

In step S18, the scramble information and the scramble decision result for the sub channel as the processing object at this point are determined to be unknown, and the processing is advanced to step S20.

In step S20, whether or not the determination of the acquisition of the PMT in step S16 has been performed for all the sub-channels included in the physical channel as the current processing object is determined. If CPU 10A determines that the determination has been completed for all the sub-channels, it advances the processing to step S42. On the other hand, if CPU 10A determines that the determination has not been completed for all the sub-channels, it advances the processing to step S22.

Meanwhile, in step S16, if CPU 10A determines that the PMT of the sub-channel as the current processing object could be acquired, in step S24, CPU 10A executes processing for extracting a list of PIDs of video packets (Video_PID) and PIDs of audio packets (Audio_PID) configuring the sub-channel as the current processing object (information as shown in field 902 in FIG. 7) from the PMT, and then, advances the processing to step S26.

In step S26, CPU 10A checks whether a value of the "transport scrambling control" bit field or the "PES scrambling control" bit field corresponds to "having scramble" for each of the video packets and the audio packets configuring the sub-channel as the current processing object.

In step S28, CPU 10A determines whether or not the result of the check in step S26 indicates "having scramble", and if the result indicates "having scramble", CPU 10A advances the processing to step S30, while CPU 10A determines otherwise, it advances the processing to step S32.

In step S30, CPU 10A stores the information corresponding to the determination result in step S28 among the scramble information of the sub-channel as the current processing object (refer to FIG. 2), and returns the processing to step S20.

In step S30, if the value of the "transport scrambling control" bit field is a value corresponding to "having scramble" in the check of the data in step S26, CPU 10A stores the information so as to fill in a "Y" mark in the field of "transport" in FIG. 2 for the sub-channel as the current processing object. Moreover, if the value of "PES scrambling control" bit field is a value corresponding to "having scramble" as the result of the check in step S26, CPU 10A stores the information so as to fill in the "Y" mark in the field of "PES" in FIG. 2.

Referring to FIG. 4, in step S32, CPU 10A executes scramble-decision-candidate PID selecting processing, which is processing for selecting a video packet or an audio packet utilized for acquiring the scramble decision result (refer to FIG. 2). Now, referring to FIG. 5 showing a flowchart of a subroutine of the processing of interest, this processing is described.

Figure 5:
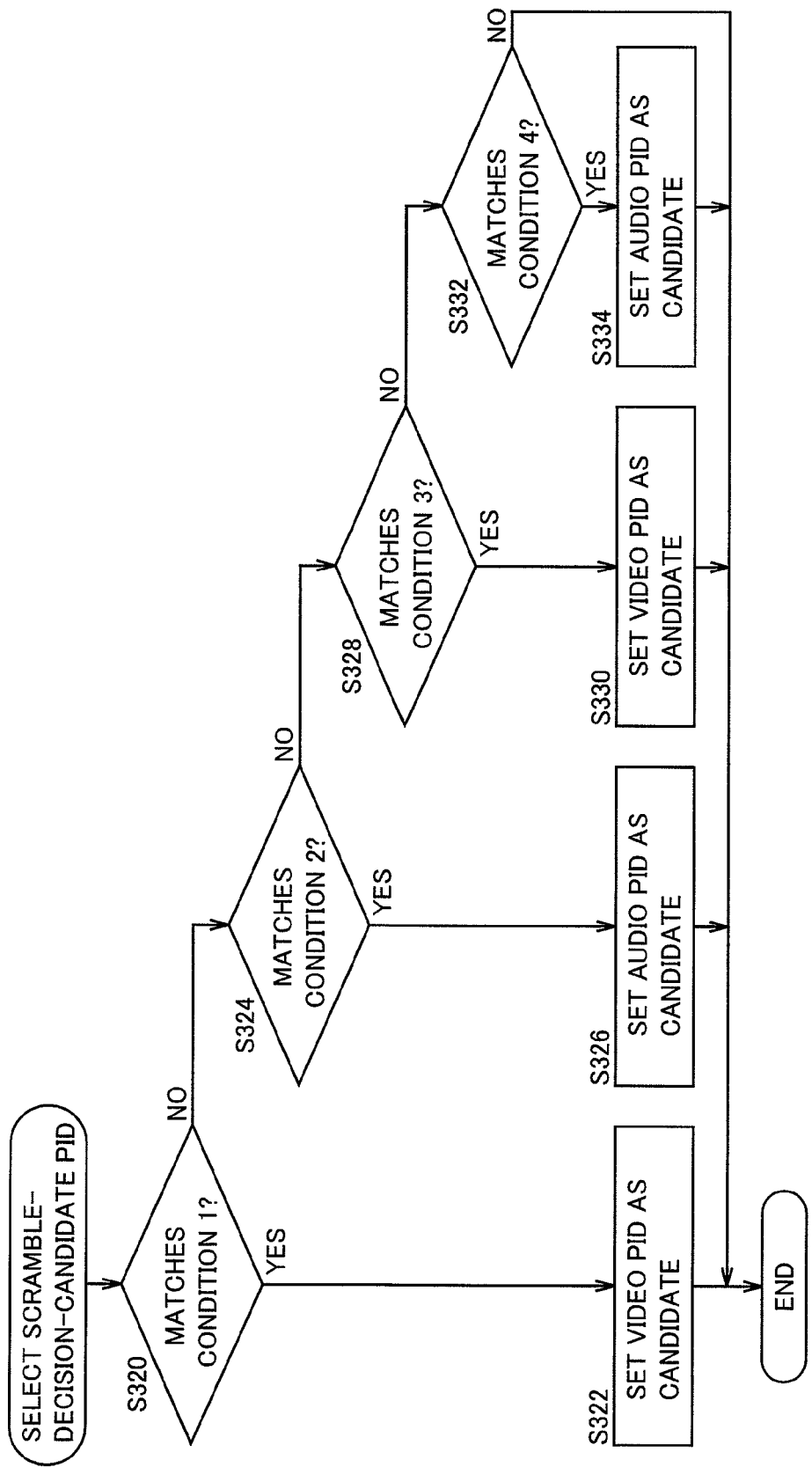
FIG. 5 is a flowchart of a subroutine of scramble-decision-candidate PID selecting processing in FIG. 4.

Referring to FIG. 5, in the scramble-decision-candidate PID selecting processing, CPU 10A, first in step S320, determines whether or not there exists a video packet matching a "condition 1" from the video packets configuring the sub-channel as the current processing object, and if CPU 10A determines that the video packet of interest exists, it advances the processing to step S322, while if CPU 10A determines that the video packet of interest does not exist, it advances the processing to step S324.

Now, referring to Table 1, "condition 1" to "condition 4" utilized for the scramble-decision-candidate PID selecting processing are described.

TABLE 1

| | CONTENTS |
|---|---|
| CONDITION 1 | "VIDEO_PID DOES NOT HAVE INVALID VALUE" AND "VIDEO_PID IS NOT NULL_PID" AND "VIDEO_PID MATCHES PCR_PID" |
| CONDITION 2 | "AUDIO_PID DOES NOT HAVE INVALID VALUE" AND "AUDIO_PID IS NOT NULL_PID" AND "AUDIO_PID MATCHES PCR_PID" |
| CONDITION 3 | "VIDEO_PID DOES NOT HAVE INVALID VALUE" AND "VIDEO_PID IS NOT NULL_PID" |
| CONDITION 4 | "AUDIO_PID DOES NOT HAVE INVALID VALUE" AND "AUDIO_PID IS NOT NULL_PID" |

Referring to Table 1, "condition 1" is a condition that the PID of the video packet does not have an invalid value, does not indicate a NULL packet, and matches a PCR_PID in the sub-channel as the current processing object.

"Condition 2" is a condition that the PID of the audio packet configuring the sub-channel as the current processing object does not have an invalid value, does not have a value indicating a NULL packet, and matches the PCR_PID in the sub-channel as the current processing object. The "invalid value" denotes a value exceeding 13 bits, and more specifically, a value of 0x2000 or more (hexadecimal notation).

Moreover, the PID indicating the NULL packet is "ox1FFF".

"Condition 3" is that the PID of the video packet configuring the sub-channel as the processing object does not have an invalid value, and is not the NULL_PID.

"Condition 4" is that the PID of the audio packet configuring the sub-channel as the processing object does not have an invalid value, and is not the NULL_PID.

Referring back to FIG. 5, in step S322, CPU 10A returns the processing to FIG. 4 with the video packet having the PID matching condition 1 set as a candidate for the scramble decision.

Meanwhile, in S324, CPU 10A determines whether or not there exists a packet matching condition 2 in the video packets and the audio packets configuring the sub-channel as the current processing object, and if CPU 10A determines that the packet matching condition 2 exists, it advances the processing to step S326, while if CPU 10A determines that the packet of interest does not exist, it advances the processing to step S328.

In step S326, the processing is returned to FIG. 4 with the packet (audio packet) matching condition 2 set as a candidate for the scramble decision object.

In step S328, CPU 10A determines whether or not there exists a packet matching condition 3 in the video packets and the audio packets configuring the sub-channel as the current processing object, and if CPU 10A determines that the packet matching condition 3 exists, it advances the processing to step S330, while if CPU 10A determines that the packet of interest does not exist, it advances the processing to step S332.

In step S330, CPU 10A returns the processing to FIG. 4 with the packet (video packet) matching condition 3 set as a candidate for the scramble decision object. It is considered that a plurality of video packets matching condition 3 exist in each of the sub-channels. In this case, CPU 10A decides the candidate of the video packet as the scramble decision object in accordance with a predetermined rule (e.g., a packet having the smallest value of the PID) in step S330.

In step S332, CPU 10A determines whether or not there exists a packet matching condition 4 in the video packets and the audio packets configuring the sub-channel as the current processing object, and if CPU 10A determines that the packet matching condition 4 exists, it advances the processing to step S334, while if CPU 10A determines that the packet of interest does not exist, it advances the processing to FIG. 4 as it is.

In step S334, CPU 10A returns the processing to FIG. 4 with the packet (audio packet) matching condition 4 set as a candidate for the scramble decision object. It is considered that a plurality of audio packets matching condition 4 exist in each of the sub-channels. In this case, CPU 10A decides the candidate of the audio packet as the scramble decision object in accordance with a predetermined rule (e.g., a packet having the smallest value of the PID) in step S334.

Referring back to FIG. 4, after selecting the PID of the candidate of the packet as the scramble decision object, in step S34, CPU 10A causes decoder 22 to decode the packet corresponding to the PID selected in step S32, and advances the processing to step S36.

In step S36, whether or not the packet decoded in step S34 could be decoded properly is determined, and if it is determined that it could be decoded properly, the processing is advanced to step S38, while if it is determined that the decoding failed, the processing is advanced to step S40.

The determination in step S36 can be performed by employing a well-known technique of, for example, checking whether or not the audio is outputted when the data resulting from the decoding of the audio packet is reproduced, or the like.

In step S38, CPU 10A advances the processing to step S42 with the decision result of "having no scramble" for the sub-channel as the current processing object.

In step S40, CPU 10A advances the processing to step S42 with the decision result of "having scramble" for the sub-channel as the current processing object.

Referring to FIG. 3, in step S42, CPU 10A stores the scramble information or the scramble decision result, which are temporarily stored in step 12, in step S30, in step S38 or in step S40, or in step 18, so as to reflect the information on the channel map as shown in FIG. 2, and ends the processing.

In the channel map creating processing described with reference to FIGS. 3 to 5, the processing for creating the channel map for one physical channel has been described. In broadcast receiving apparatus 1, CPU 10A performs the similar processing for all physical channels to complete the channel map.

In the present embodiment described above, broadcast receiving apparatus 1 receives various packets for the digital television broadcast through antenna 30. In broadcast receiving apparatus 1, if the bit field for decision of the scramble information (refer to FIG. 2) does not exist in a received packet of interest, a PID of a packet as the candidate for the processing for obtaining the scramble decision result (refer to FIG. 2) is selected by the scramble-decision-candidate PID selecting processing.

While in the present embodiment, the PID of one packet is selected, in the broadcast receiving apparatus according to the present invention, the number of the PIDs of the selected packets does not need to be one, as long as the PIDs selected as the candidates for the packets utilized for the decision of the requirement for the descramble processing correspond to a part of received video packets (or audio packets) instead of all the received video packets (or audio packets). Namely, the number of the packets utilized for the decision of the requirement for the descramble processing does not need to be "1", as long as they are a part of the received video packets (and/or audio packets). However, as in the present embodiment, as the packet utilized for the determination, one packet of the video packets or the audio packets received in each sub-channel is selected, that is, one packet is selected as the packet as the processing object in steps S34 to S40, and therefore, the decision of the requirement for the descramble processing of the sub-channel can be performed in a short time.

Moreover, in the selection of the PID as described above, as described with reference to FIG. 5, PIDs matching conditions 1 to 4 are sequentially selected from the video packets and the audio packets configuring the sub-channel as the processing object. More specifically, a PID of the video packet that does not have an invalid value, does not indicate a NULL packet, and matches the PCR_PID is selected. If such a PID does not exist, a PID of the audio packet having the similar condition is selected (condition 2).

Thus, it is because probability that the video packet is included in the sub-channel is generally higher than probability that the audio packet is included that in the present embodiment, the video packet is preferentially selected as the packet as the candidate for the scramble decision. That is, it is for shortening the time required for the scramble-decision-candidate PID selecting processing.

Moreover, in the scramble-decision-candidate PID selecting processing described with reference to FIG. 5, a PID matching condition 1 is preferentially selected rather than a PID matching condition 3, and a PID matching condition 2 is preferentially selected rather than a PID matching condition 4. Namely, a PID matching the PCR_PID is preferentially selected.

A PCR includes information of reference clock that an MPEG decoder refers to, and CPU 10A synchronously outputs video and/or audio in accordance with the clock. The PCR_PID is often matched with a Video_PID in a case of normal television broadcast, and with an Audio_PID in a case of broadcast for a music channel to be assigned. In the present embodiment, utilizing this tendency, the PCR_PID is interpreted as a "PID including a PES to which importance is given within the sub-channel", and the Video_PID or the Audio_PID matching this is set as a candidate of the scramble decision.

In the present embodiment described above, if the bit field for acquiring the scramble information is not included in the received packet, then one of the packets configuring the sub-channel is set as an object of the scramble decision. As compared with the conventional art, this can largely shorten the processing time required for creating the channel map by about 5 seconds or the like per sub-channel.

In the present embodiment described above, configuration information including the first information (PCR_PID) that identifies a clock reference packet including the clock reference information (PCR) and the second information (Video_PID, Audio_PID), which is information for identifying a video packet or an audio packet, is configured by the PMT for each sub-channel.

Moreover, in the present embodiment described above, the first information for identifying a clock reference packet configuring a predetermined channel (sub-channel) is configured by the PCR_PID of each sub-channel.

In the present embodiment, the second information that is information for identifying a video packet is configured by the Video_PID, and the second information that is information for identifying an audio packet is configured by the Audio_PID.

In the present embodiment described above, the channel map creating processing described with reference to FIGS. 3 to 5 is processing corresponding to one physical channel. When the channel map is created in broadcast receiving apparatus 1, the above-described channel map processing is executed for each physical channel.

While in the present embodiment, broadcast receiving apparatus 1 as one example of the digital broadcast receiving apparatus receives packets configuring a program by receiving electric waves through antenna 30, the reception aspect of the program by the digital broadcast receiving apparatus of the present invention is not limited to this. Namely, for example, broadcast receiving apparatus 1 may further include a configuration part that performs data transmission and reception through a network such as the Internet or the like, and using the part, may receive the packets configuring the program through the above-described network. Moreover, in this case, broadcast receiving apparatus 1 may be wired to the network, or may be connected thereto wirelessly. In this case, in broadcast receiving apparatus 1, the packets received in the above-described manners are subjected to the processing described with reference to FIGS. 3 to 5.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A digital broadcast receiving apparatus comprising:
a receiver that receives video packets or audio packets configuring a program of digital broadcast;
a determination unit that determines whether or not decoding of the packets received by said receiver has been completed normally; and
a decision unit that decides a requirement for descramble processing of each channel based on the determination result of said determination unit,
wherein the decision unit:
determines whether there exists a video packet matching a first condition for the requirement for descramble processing of each channel, the first condition requiring that a packet identifier (PID) of the video packet does not have an invalid value, does not indicate a NULL packet, and matches a program clock reference packet identifier (PCR_PID) in a channel as a current processing object.

2. The digital broadcast receiving apparatus of claim 1, wherein the decision unit further determines whether there exists an audio packet matching a second condition for the requirement for descramble processing of each channel, the second condition requiring that the PID of the audio packet configuring the channel as the current processing object does not have an invalid value, does not have a value indicating a NULL packet, and matches the PCR_PID in the channel as the current processing object.

3. The digital broadcast receiving apparatus of claim 2, wherein the decision unit further determines whether the video packet matches a third condition, the third condition requiring that the PID of the video packet configuring the channel as the processing object does not have an invalid value, and is not a NULL_PID.

4. The digital broadcast receiving apparatus of claim 3, wherein the decision unit further determines whether the audio packet matches a fourth condition, the fourth condition requiring that the PID of the audio packet configuring the channel as the processing object does not have an invalid value, and is not a NULL_PID.

5. The digital broadcast receiving apparatus of claim 1, wherein the decision unit, before the determination whether there exists a video packet matching the first condition for the requirement for descramble processing of each channel:
decides the requirement for the descramble processing of each channel based on a value of a specific bit field of each of the video packets or the audio packets of each channel received by the receiver, and
decides, for a channel for which the requirement for descramble processing based on the value of the specific bit field could not be decided, the requirement for the descramble processing based on the determination result of the determination unit.

6. The digital broadcast receiving apparatus of claim 2, wherein the decision unit, before the determination whether there exists a video packet matching the first condition for the requirement for descramble processing of each channel:
decides the requirement for the descramble processing of each channel based on a value of a specific bit field of each of the video packets or the audio packets of each channel received by the receiver, and
decides, for a channel for which the requirement for descramble processing based on the value of the specific bit field could not be decided, the requirement for the descramble processing based on the determination result of the determination unit.

7. The digital broadcast receiving apparatus of claim 3, wherein the decision unit, before the determination whether there exists a video packet matching the first condition for the requirement for descramble processing of each channel:
decides the requirement for the descramble processing of each channel based on a value of a specific bit field of each of the video packets or the audio packets of each channel received by the receiver, and
decides, for a channel for which the requirement for descramble processing based on the value of the specific bit field could not be decided, the requirement for the descramble processing based on the determination result of the determination unit.

8. The digital broadcast receiving apparatus of claim 4, wherein the decision unit, before the determination whether there exists a video packet matching the first condition for the requirement for descramble processing of each channel:
decides the requirement for the descramble processing of each channel based on a value of a specific bit field of each of the video packets or the audio packets of each channel received by the receiver, and
decides, for a channel for which the requirement for descramble processing based on the value of the specific bit field could not be decided, the requirement for the descramble processing based on the determination result of the determination unit.

9. The digital broadcast receiving apparatus of claim 2, wherein a channel map for the channel comprises a scramble decision result field for storing a determination result of the decision unit.

10. The digital broadcast receiving apparatus of claim 3, wherein a channel map for the channel comprises a scramble decision result field for storing a determination result of the decision unit.

11. The digital broadcast receiving apparatus of claim 4, wherein a channel map for the channel comprises a scramble decision result field for storing a determination result of the decision unit.

12. A digital broadcast receiving apparatus comprising:
 a receiver that receives video packets or audio packets configuring a program of digital broadcast;
 a determination unit that determines whether or not decoding of the packets received by said receiver has been completed normally; and
 a decision unit that decides a requirement for descramble processing of each channel based on the determination result of said determination unit,
 wherein the decision unit:
  determines whether there exists an audio packet matching a first condition for the requirement for descramble processing of each channel, the first condition requiring that a packet identifier (PID) of the audio packet configuring a channel as the current processing object does not have an invalid value, does not have a value indicating a NULL packet, and matches the program clock reference packet identifier (PCR_PID) in the channel as the current processing object.

13. The digital broadcast receiving apparatus of claim 12, wherein the decision unit, before the determination whether there exists a video packet matching the first condition for the requirement for descramble processing of each channel:
 decides the requirement for the descramble processing of each channel based on a value of a specific bit field of each of the video packets or the audio packets of each channel received by the receiver, and
 decides, for a channel for which the requirement for descramble processing based on the value of the specific bit field could not be decided, the requirement for the descramble processing based on the determination result of the determination unit.

14. The digital broadcast receiving apparatus of claim 12, wherein a channel map for the channel comprises a scramble decision result field for storing a determination result of the decision unit.

15. A digital broadcast receiving apparatus comprising:
 a receiver that receives video packets or audio packets configuring a program of digital broadcast;
 a determination unit that determines whether or not decoding of the packets received by said receiver has been completed normally; and
 a decision unit that decides a requirement for descramble processing of each channel based on the determination result of said determination unit,
 wherein the decision unit:
  decides the requirement for the descramble processing of each channel based on a value of a specific bit field of each of the video packets or the audio packets of each channel received by the receiver, and
  decides, for a channel for which the requirement for descramble processing based on the value of the specific bit field could not be decided, the requirement for the descramble processing based on the determination result of the determination unit, and
  determines whether there exists a video packet matching a first condition for the requirement for descramble processing of each channel, the first condition requiring that a packet identifier (PID) of the video packet configuring a channel as the processing object does not have an invalid value, and is not a NULL_PID.

16. The digital broadcast receiving apparatus of claim 15, wherein the decision unit, before the determination whether there exists a video packet matching the first condition for the requirement for descramble processing of each channel:
 decides the requirement for the descramble processing of each channel based on a value of a specific bit field of each of the video packets or the audio packets of each channel received by the receiver, and
 decides, for a channel for which the requirement for descramble processing based on the value of the specific bit field could not be decided, the requirement for the descramble processing based on the determination result of the determination unit.

17. The digital broadcast receiving apparatus of claim 15, wherein a channel map for the channel comprises a scramble decision result field for storing a determination result of the decision unit.

18. A digital broadcast receiving apparatus comprising:
 a receiver that receives video packets or audio packets configuring a program of digital broadcast;
 a determination unit that determines whether or not decoding of the packets received by said receiver has been completed normally; and
 a decision unit that decides a requirement for descramble processing of each channel based on the determination result of said determination unit,
 wherein the decision unit:
  determines whether there exists an audio packet matching a first condition for the requirement for descramble processing of each channel, the first condition requiring that a packet identifier (PID) of the audio packet configuring a channel as the processing object does not have an invalid value, and is not a NULL_PID.

19. The digital broadcast receiving apparatus of claim 18, wherein the decision unit, before the determination whether there exists a video packet matching the first condition for the requirement for descramble processing of each channel:
 decides the requirement for the descramble processing of each channel based on a value of a specific bit field of each of the video packets or the audio packets of each channel received by the receiver, and
 decides, for a channel for which the requirement for descramble processing based on the value of the specific bit field could not be decided, the requirement for the descramble processing based on the determination result of the determination unit.

20. The digital broadcast receiving apparatus of claim 18, wherein a channel map for the channel comprises a scramble decision result field for storing a determination result of the decision unit.

* * * * *